United States Patent [19]

Langen

[11] Patent Number: 4,771,877
[45] Date of Patent: Sep. 20, 1988

[54] LOAD SPACING CONVEYOR SYSTEM

[75] Inventor: Marinus J. M. Langen, Toronto, Canada

[73] Assignee: H. J. Langen & Sons Limited, Mississauga, Canada

[21] Appl. No.: 46,111

[22] Filed: May 5, 1987

[51] Int. Cl.$^4$ .............................................. B65G 47/31
[52] U.S. Cl. .................................... 198/461; 198/579
[58] Field of Search .............. 198/460, 461, 579, 719, 198/721

[56] References Cited

U.S. PATENT DOCUMENTS

| | | | |
|---|---|---|---|
| 3,162,294 | 12/1964 | Dieter | 198/460 |
| 3,335,841 | 8/1967 | Klingel et al. | 198/460 |
| 3,348,655 | 10/1967 | Pierce et al. | 198/466 |
| 3,721,330 | 3/1973 | Crawford et al. | 198/461 |
| 3,917,053 | 11/1975 | Matsuyama | 198/719 |
| 3,944,057 | 3/1976 | Schvette et al. | 198/721 |
| 4,325,477 | 4/1982 | Heikinheimo | 198/461 |
| 4,529,082 | 7/1985 | Mally | 198/461 |

*Primary Examiner*—Joseph E. Valenza
*Attorney, Agent, or Firm*—Fetherstonhaugh & Co.

[57] ABSTRACT

A feeder mechanism for feeding load items in a predetermined spaced relationship into a loading station of a carton loading machine comprises at least two conveyors which move at different speeds along the same path and elevator ramps on each of the conveyors. The primary conveyor has a forward run mounted for movement at a first predetermined speed in a forward direction. The forward run has an input end for receiving load items and it extends forwardly from the input end into a spacing station. The secondary conveyor has a forward run mounted for movement at a second speed in the forward direction which is faster than the first speed. At least a portion of the forward run of the second conveyor is located adjacent and coextensive with a portion of the forward run of the primary conveyor in the spacing station. A plurality of elevator ramps are mounted on the secondary conveyor at longitudinally spaced intervals therealong. Each ramp has a ramp face which is upwardly and rearwardly inclined in a direction opposite to the forward direction. The leading end of each ramp is disposed at or below the level of the adjacent primary conveyor and the trailing end of each ramp being disposed at a level above the level of the adjacent first conveyor. The ramps are aligned with load items supported on the first conveyor in use such that as the secondary conveyor accelerates the ramps with respect to the primary conveyor, the ramp face will pass under a load item and elevate it out of contact with the primary conveyor and thereafter transport the load items through the spacing station with successive load items being spaced from one another.

6 Claims, 6 Drawing Sheets

LOAD SPACING CONVEYOR SYSTEM

This invention relates to a feeder mechanism for feeding load items in a spaced relationship. In particular, this invention relates to a feeder mechanism for use in a carton loading machine or the like.

PRIOR ART

In carton loading equipment, difficulty has long been experienced in spacing the items which have to be loaded prior to entry into the loading machine. Numerous complex mechanisms have been provided for this purpose.

It is an object of the present invention to provide a simple and inexpensive spacer mechanism which is capable of spacing and supplying load items to a carton loading machine at high speed.

It is a further object of the present invention to provide a high speed spacing mechanism which permits accurate spacing of the load items as they are transported in a continuous forward motion through a spacing station.

It is a further object of the present invention to provide a simple and inexpensive spacer mechanism in which two transport conveyors extend through a spacing station at different speeds and wherein ramps are provided on the faster moving conveyor at uniformly spaced intervals along the length thereof which serve to raise the load items carried by the other conveyor so that they are uniformly spaced when supported on the elevator ramps.

According to one aspect of the present invention there is provided a feeder mechanism for feeding load items in a predetermined spaced relationship into a loading station of a carton loading machine or the like comprising a primary conveyor having a forward run mounted at a first predetermined speed in a forward direction, said forward run having an input end for receiving load items, the forward run extending forwardly from the input end into a spacing station, a secondary conveyor having a forward run mounted for movement at a second speed in said forward direction which is faster than said first speed, at least a portion of the forward run of the second conveyor being located adjacent and coextensive with a portion of the forward run of the primary conveyor in said spacing station, a plurality of elevator ramps mounted on said secondary conveyor at longitudinally spaced intervals therealong, each ramp having a ramp face which is upwardly and rearwardly inclined in a direction opposite to said forward direction, the leading end of each ramp being disposed at or below the level of the adjacent first conveyor and the trailing end of each ramp being disposed at a level above the level of the adjacent first conveyor, said ramps being aligned with load items supported on the first conveyor in use such that as the secondary conveyor accelerates the ramps with respect to the primary conveyor, the ramp face will pass under a load item and elevate it out of contact with the primary conveyor and thereafter transport the load items through the spacing station with successive load items being spaced from one another.

The invention will be more clearly understood after reference to the following detailed specification read in conjunction with the drawings wherein.

Figure 1:
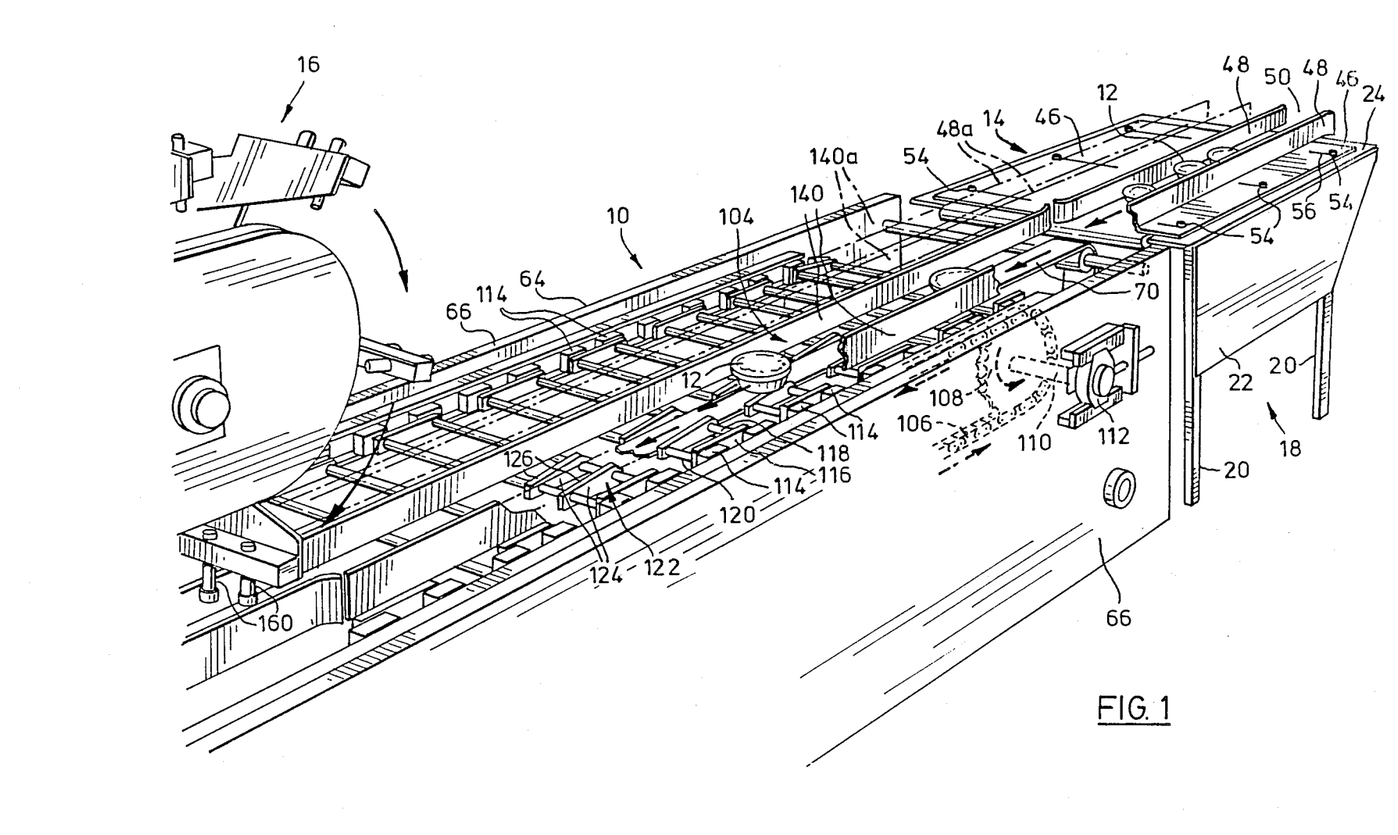
FIG. 1 is a pictorial view of the spacing station of a carton loading machine illustrating a feeder mechanism constructed in accordance with an embodiment of the present invention.

With reference to FIG. 1 of the drawings, the reference numeral 10 refers generally to a feeder mechanism constructed in accordance with an embodiment of the present invention. The feeder mechanism 10 receives load items 12, one at a time from an in-feed conveyor assembly 14 and delivers the items to a transfer assembly 16. The feeder mechanism serves to arrange the load items 12 in a predetermined spaced relationship to facilitate their transfer to a carton loading machine or the like.

In-Feed Conveyor

Figure 2:
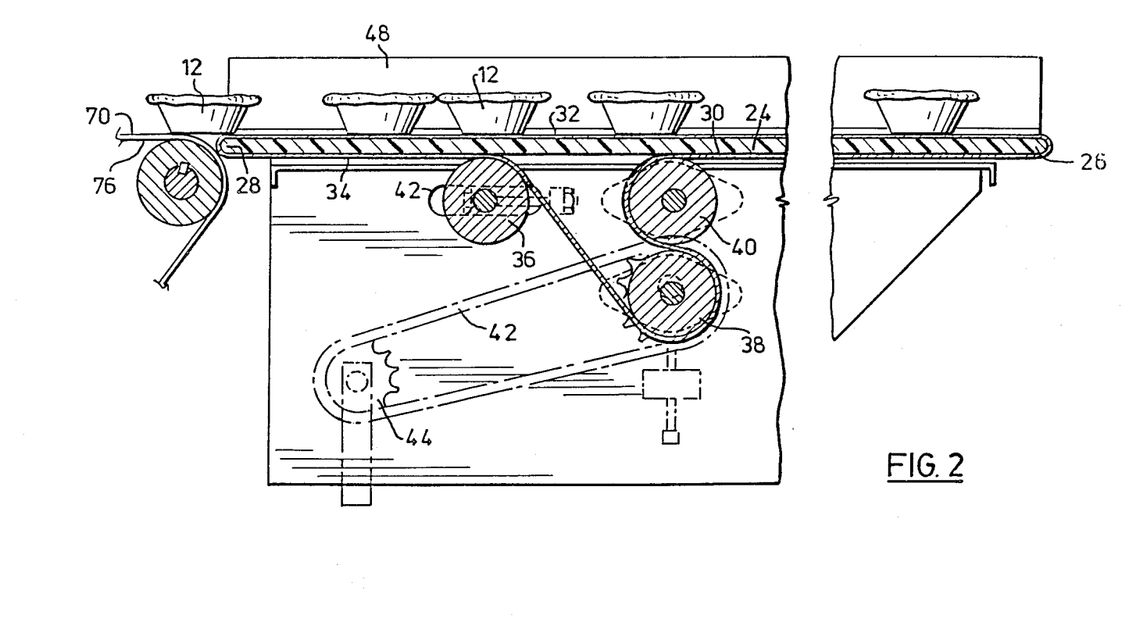
FIG. 2 is a sectional side view taken along the line 2—2 of FIG. 3.
Figure 3:
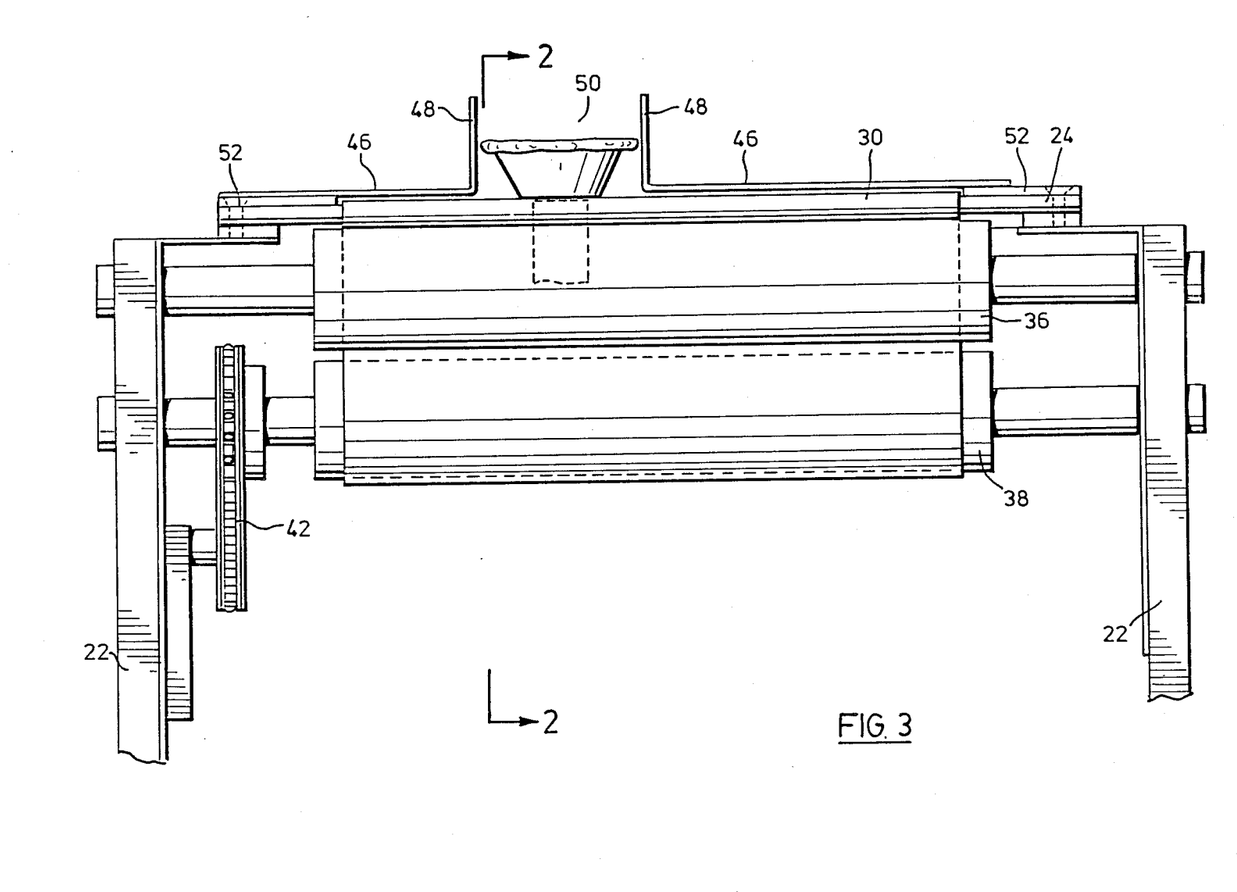
FIG. 3 is an end view taken along the line 3—3 of FIG. 2.

The in-feed conveyor assembly 14 comprises a frame which is generally identified by the reference numeral 18 and which includes support legs 20, side walls 22 and a platform 24. The platform 24 is made from a rigid body of plastic material which has a low coefficient of friction. As shown in FIG. 2 of the drawings, the upstream edge 26 and the downstream edge 28 of the platform 24 are rounded. An infeed conveyor belt 30 is mounted on the platform 24. The forward run 32 of the infeed conveyor 30 extends along the top face of the platform 24. The return run 34 extends around a series of rollers 36, 38 and 40. The roller 36 is a tensioning roller which is adjustably mounted in slots 42 so as to be moveable to adjust the tension in the infeed conveyor. The roller 40 is an idler roller and the roller 38 is a driven roller. The driven roller 38 is driven from a power source (not source) by means of a drive chain 42 which is connected to a driven sprocket 44.

A pair of guide plates 46 are each mounted on support plates 52 which are arranged at opposite side edges of the platform 24. The guide plates 46 each have an upstanding inner wall 48 which are oppositely disposed and serve to form a guide channel 50 therebetween which serves to guide the load items 12 as they are driven along the infeed conveyor. Adjustment slots 56 are formed in the guide plates 46 and adjustment screws 54 extend through the slots 56 so as to permit adjustment of the width and alignment of the guide channel 50.

This infeed conveyor mechanism is simple and inexpensive in that it fits freely over the countertop without requiring a complex system of rollers to support the conveyor. By providing a countertop which is made from a low friction plastic material to support the forward run of the conveyor, a smooth flat forward run is provided which provides for the smooth movement of load items 12 therealong.

Feeder Mechanism

The feeder mechanism 10 will now be described with reference to FIGS. 1, 4 and 5 of the drawings. The feeder mechanism 10 comprises a primary conveyor 60 and a secondary conveyor 62. A housing 64 has a pair of oppositely disposed side walls 66 which form frame members which support the various guide rollers and drive shafts which guide and drive the primary conveyor 60 and secondary conveyor 62.

The primary conveyor 60 comprises a narrow flexible conveyor belt 68 which has a horizontally extending forward run 70 and a return run 72. A guide roller 74 is located at the input end 76 of the forward run 70 and a guide roller 78 is located at the discharge end 80 of the forward run 70. Additional rollers 82, 84, 86 and 88 serve to guide the return run 72 of the conveyor. The roller 84 is a driven roller which has a drive sprocket 90 which is connected by means of a chain 92 to a drive sprocket 94 which is mounted on the driven shaft 96. The driven shaft 96 is driven from a power source (not shown) by means of a drive chain 98 and a drive sprocket 100. It will be noted that the sprocket 94 is smaller than the sprocket 102 such that as will be described hereinafter, the primary conveyor belt 70 is driven at a first speed which is slower than that of the secondary conveyor 62.

The forward run of the primary conveyor 70 extends into and through a spacing station generally identified by the reference numeral 104 (FIG. 1). The load items are rearranged to a required longitudinally spaced relationship.

Secondary Conveyor

The secondary conveyor 62 comprises a pair of chains 106 which extend between sprockets 102 and 108 which are mounted on the driven shaft 96 and idler shaft 110. Tension is maintained in the chains 106 by means of an adjustable bearing assembly 112. The chains 12 each have mounting blocks 114 located at spaced intervals along the length thereof. Bridging plates 116 extend between adjacent mounting blocks 114 and transverse guide rods 118 and 120 extend transversely between opposite bridging plates 116. A plurality of elevator ramps generally identified by the reference numeral 122 are provided at spaced intervals along the secondary conveyor. The ramps 122 each comprise a pair of ramp plates 124 which are mounted on the transverse guide rods 118 and 120 and are arranged one on either side of the forward run 70 of the primary conveyor during passage through the spacing station 104.

Each ramp plate 124 has a ramp face 126 which is upwardly and rearwardly inclined in a direction to the direction of forward movement of the primary and secondary conveyor. The ramp faces 126 are inclined at an angle of about 1° to 5° with respect to the plane of the forward run 70.

The secondary conveyor 62 has a forward run 128 and a return run 130. The forward run 28 is coextensive with a portion 70a of the forward run 70 of the primary conveyor. The forward run 128 of the secondary conveyor has an upstream end 132 which is spaced a substantial distance from the input end 76 of the primary conveyor. The forward run 128 also has a downstream end 134 which is spaced from the discharge end 80 of the forward run 70 of the primary conveyor.

Figure 4:
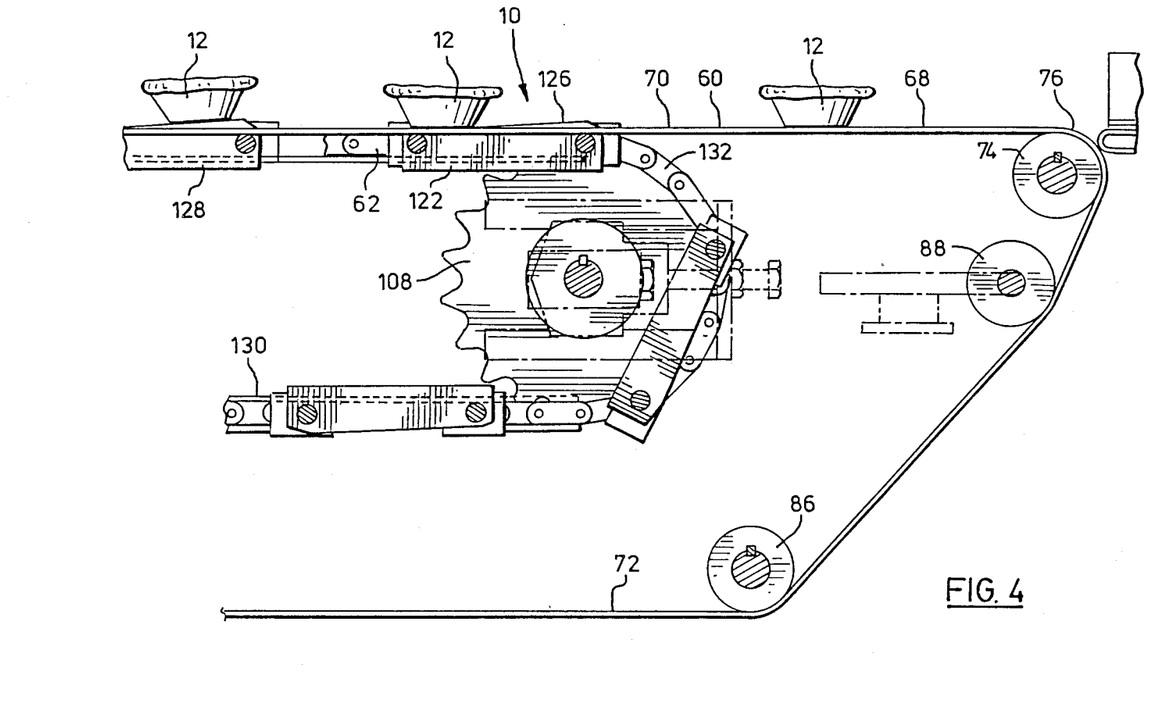
FIG. 4 is a partially sectioned side view showing the input end of the primary conveyor and the upstream end of the secondary conveyor.
Figure 5:
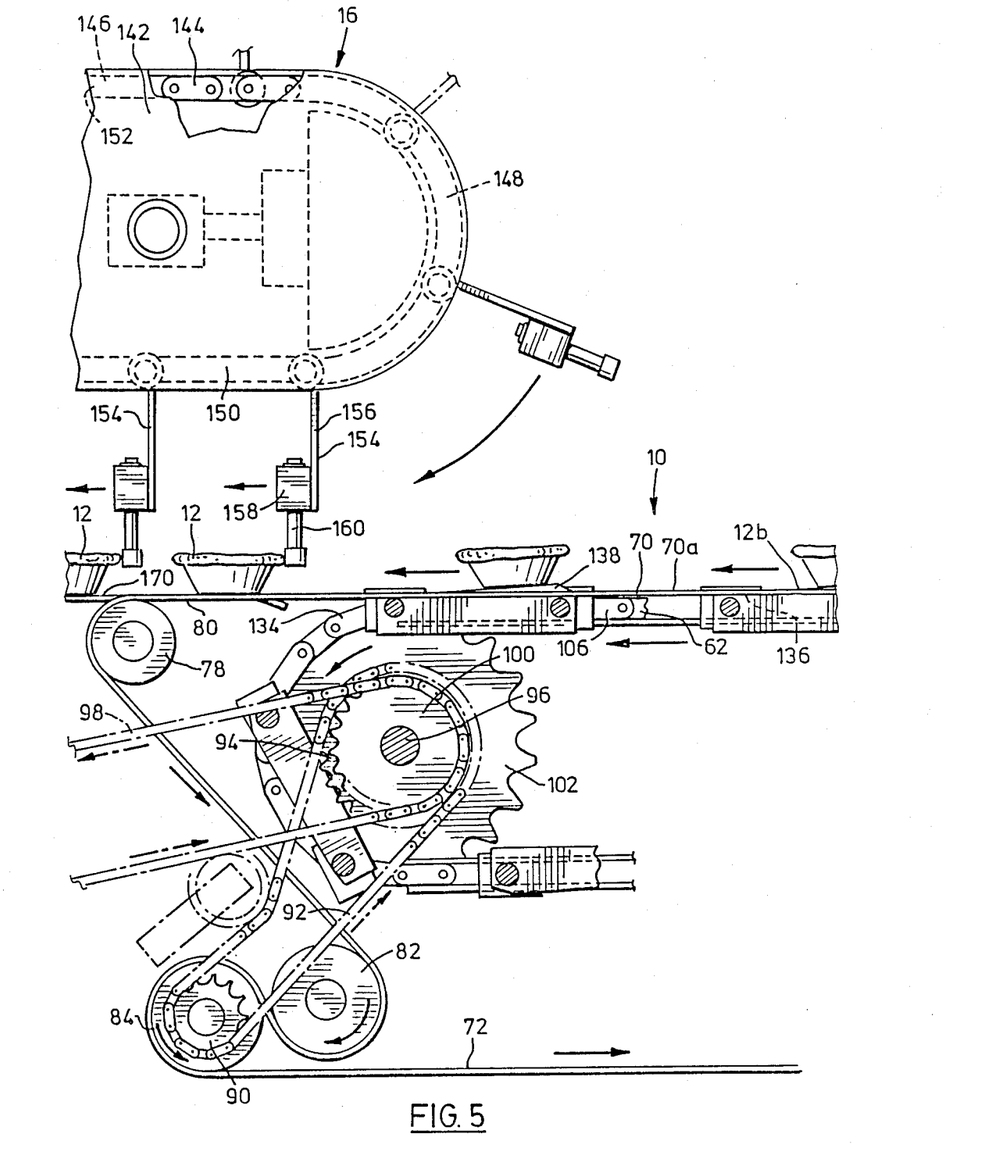
FIG. 5 is a sectional side view showing the discharge end of the primary conveyor and downstream end of the secondary conveyor and the transfer mechanism.

As shown in FIGS. 4 and 5 of the drawings, when the elevator ramps 122 are driven along the forward run 128, the leading end 136 of the ramp face 126 is located at a level below the level of the forward run 70 of the primary conveyor and the trailing end 130 which projects above the level of the forward run 70 of the primary conveyor.

As previously indicated, the drive sprocket 102 which is meshed with the chains 106 is larger in diameter than the drive sprocket. In addition, the sprocket 90 which is driven from the sprocket 94 is smaller than the sprocket 94 thereby effecting a further reduction in speed of the primary conveyor relative to the secondary conveyor. The elevator ramps 122 are arranged one on either side of the primary conveyor and serve to provide a stable platform for supporting the load items for transportation through the transfer station.

For the purposes of retaining the load items 12 against lateral movement, oppositely disposed guide rails 140 are provided. These guide rails are mounted for lateral adjustment so as to be aligned with the upstanding walls 48 of the guide plates 46 of the infeed conveyor assembly.

Transfer Mechanism

Figure 7:
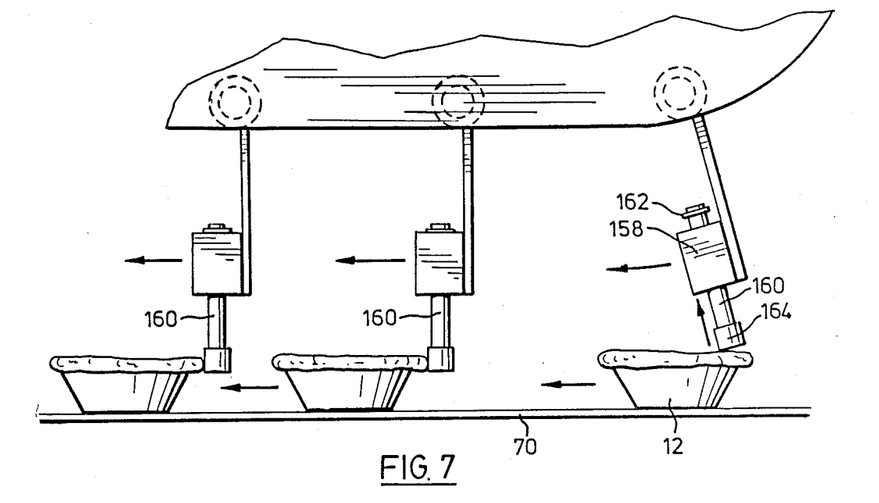

The transfer mechanism 16 will now be described with reference to FIGS. 1, 5 and 7 of the drawings. The tranfer mechanism 16 includes side walls 142 which provide a guide track 146 for a third conveyor 144 which is in the form of an endless chain. The guide track 146 includes an arcuate portion 148, a forward run portion 150 and a return run portion 152. A plurality of pusher members 154 are mounted at spaced intervals along the third conveyor 144. Each of the pusher members 154 includes an arm 156 which has a support block 158 located at its outer end. A pair of fingers 160 are slideably mounted in the support blocks 158. The fingers 160 are weighted so as to normally assume the fully extended position shown in FIGS. 1 and 5 of the drawings when travelling along the forward run. As shown in FIG. 7, however, if a load item 12 is not correctly positioned on the primary conveyor, the fingers 160 will slide in the support block 158 to a raised position. A locking ring 162 serves to limit the extent to which the fingers 160 can be lowered and a collar 164 serve to limit the extent to which the fingers 160 can be raised with respect to the support block 158.

It will be noted that the input end of the transfer conveyor is located above the discharge end of the primary conveyor. The arcuate portion of the guide track provides a lead-in portion for the third conveyor which extends downwardly and forwardly toward the forward run of the primary conveyor so that successive pusher fingers will be accelerated into contact with successive spaced load items and will push the load items off of the discharge end of the primary conveyor onto the transfer platform 170. The load items 12 are then transferred to an end loading carton machine or the like such as that described in U.S. Pat. No. 3,968,623.

Method of Operation

In use, load items 12 such as the pies illustrated in the preferred embodiment are supplied from any suitable source to the infeed conveyor which is driven at a speed which is lower than the speed of forward movement of the forward run 70 of the primary conveyor 60. The downstream edge 28 of the infeed conveyor is located closely adjacent the input end 76 of the forward run 70 of the conveyor belt 68 so that the load items 12 can be transferred smoothly from the infeed conveyor to the primary conveyor. Once on the primary conveyor, the load items 12 are accelerated away from the next following load item on the infeed conveyor by reason of the fact that the speed of forward movement of the forward run of the primary conveyor is substantially greater than that of the infeed conveyor. The speed differential between the speed of the infeed conveyor and the speed of the primary conveyor will be increased when the products are smaller.

By reason of the fact that the primary conveyor is driven at a speed which is equal to or higher than the speed of the infeed conveyor, the load items 12 will be spaced a substantial distance from one another on the primary conveyor even in circumstances where the load items are arranged in close contact with one another on the infeed conveyor. By adjusting the speed of the infeed conveyor with respect to the speed of the primary conveyor, it is possible to adjust the distance between successive load items when they are positioned on the primary conveyor.

As previously indicated, the secondary conveyor 62 is driven at a speed which is greater than the speed of the primary conveyor. As shown in FIG. 4 of the drawings, the end 132 of the forward run of the secondary conveyor is spaced a substantial distance from the input end of the primary conveyor. The forward speed of the secondary conveyor is selected to cooperate with the forward speed of the primary conveyor and infeed conveyors in an attempt to locate a load item 12 is positioned slightly in advance of each successive elevator ramp 122 as the elevator ramps emerge from below the primary conveyor. As a result of the fact that the secondary conveyor moves faster than the primary conveyor, the elevator ramps will move forwardly with respect to the primary conveyor so as to catch up with the load items 12 located immediately in advance thereof. Continued relative movement between the elevator ramps and the primary conveyor will cause the ramp faces 126 of the elevator ramps to engage the undersurface of the load item 12 and will raise the load item 12 to the elevated position shown at the left hand side of FIG. 4 of the drawings in which the load items 12 are fully supported on the elevator ramps. As a result of being supported by successive elevator ramps, successive load items are substantially uniformly spaced from one another before they arrive at the downstream end of the secondary conveyor. At the downstream end of the secondary conveyor, the elevator ramps 122 are again lowered and the load items are re-deposited on the discharge end portion 80 of the primary conveyor. Because the relative speed of the primary conveyor with respect to the secondary conveyor is fixed, despite the fact that the load items are re-deposited on the primary conveyor, they will maintain a uniformly spaced relationship with respect to one another although the distance between successive load items will be reduced by reason of the slower speed of the primary conveyor. The slowing the speed of the primary conveyor permits movement of the successive pusher assemblies of the transfer mechanism to assume a position one behind each load item for use in subsequently pushing the load items into the carton loading machine.

From the foregoing, it will be apparent that the present invention provides a simple and inexpensive form of mechanism which will permit the spacing of load items while providing for a minimal amount of handling of the load items while permitting continuous high speed movement of the load items to a carton loading machine or the like.

Figure 6:
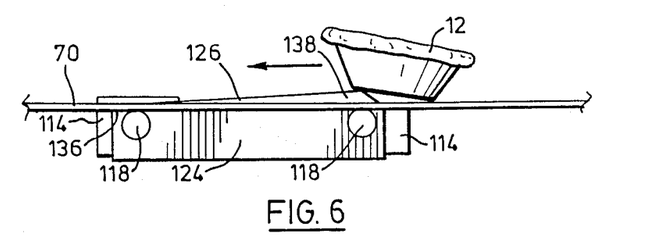
FIG. 6 is a side view taken through the primary and secondary conveyors showing a misaligned load item, and, FIG. 7 is a side view of the transfer mechanism illustrating the manner in which the pusher mechanism retracts when it engages a misaligned load item.

A further feature of the present invention is illustrated in FIG. 6 of the drawings wherein it will be seen that if a load item is misaligned on the primary conveyor when an elevator ramps makes first contact, the frictional resistance of the primary conveyor will serve to hold the load item back while the elevator ramp will advance out of contact with the load item. The subsequent elevator ramp will then make contact with the load item to elevate it and space it at twice the preferred spacing. Knobs or protrusions may be formed on the primary conveyor to add drag to the products which are misaligned to drag the products off of the primary conveyor.

Various modifications of the present invention will be apparent to those skilled in the art. One such modification is illustrated in broken lines in FIG. 1 wherein the guide rails 48a and 140a are shown to indicate the position of a second spacer mechanism arranged side-by-side with the first spacer mechanism so that the machine can operate as a "two-up" loader permitting two load items to be laterally aligned to form a loading unit for loading into a carton.

These and other modifications of the present invention will be apparent to those skilled in the art.

I claim:

1. A feeder mechanism for feeding load items in a predetermined spaced relationship into a loading station of a carton loading machine or the like comprising;
   (a) a primary conveyor having a forward run mounted for continuous movement at a first predetermined speed in a forward direction, said forward run having an input end for receiving load items, the forward run extending forwardly from the input end into a longitudinally elongated spacing station,
   (b) a secondary conveyor having a forward run mounted for continuous movement at a second speed in said forward direction which is faster than said first speed, at least a portion of the forward run of the second conveyor being located adjacent and coextensive with a portion longitudinally elongated of the forward run of the primary conveyor in said spacing station,
   (c) a plurality of elevator ramps mounted on said secondary conveyor at longitudinally spaced intervals therealong, each ramp having a ramp face which is upwardly and rearwardly inclined in a direction opposite to said forward direction, the leading end of each ramp face being disposed at or below the level of the adjacent primary conveyor and the trailing end of each ramp being disposed at a level above the level of the adjacent first conveyor, each ramp face having an elevating portion of its length extending above the level of the first conveyor, said elevating portion having a sufficient longitudinal extent to support one of said load items in position in which it is completely elevated out of contact with the primary conveyor, said ramps being aligned with load items supported on the first conveyor in use such that as the secondary conveyor accelerates the ramps with respect to the primary conveyor, the leading end of each ramp face will pass under a load item and the ramp will progressively overtake the load item and progressively accelerate it to said second speed and progressively elevate it to a position in which it is completely out of contact with the primary conveyor and thereafter transport the load items through the spacing station on the elevator ramps and out of contact with the primary conveyor with successive load items being spaced from one another.

2. A feeder mechanism as claimed in claim 1, wherein said ramp face is upwardly inclined at an angle of about 1° to 5° to provide a stable support for the load items when they are fully elevated out of contact with the primary conveyor.

3. A feeder mechanism as claimed in claim 1, wherein each ramp comprises two ramp members arranged in a side-by-side relationship, one on either side of said portion of the forward run of the primary conveyor.

4. A feeder mechanism as claimed in claim 1, wherein the forward run of the primary conveyor has a discharge end, the coextensive portion of the forwad run of the secondary conveyor having an upstream end spaced from the input end of the primary conveyor and a downstream end spaced from the discharge end of the primary conveyor, the secondary conveyor being arrangaed to lower the ramps with respect to the primary conveyor at said downstream end so as to lower the load items carried thereby onto the discharge end of the primary conveyor to be transported thereby to the discharge end thereof at said first speed.

5. A feeder mechanism as claimed in claim 4, further comprising transfer means at the discharge end of the primary conveyor for removing the spaced load items from the discharge end of the primary conveyor.

6. A feeder mechanism as claimed in claim 5, wherein said transfer means comprises an overhead conveyor having a forward run portion located above the discharge end of the primary conveyor and a lead-in portion extending downwardly and forwardly toward said forward run portion, a plurality of pusher members mounted on the overhead conveyor at spaced intervals along the length thereof, said pushers being driven along the feed-end portion at a speed in the forward direction which is greater than said first speed so that each pusher member will catch up with and push a load item located on the discharge portion of the forward run in use.

* * * * *